United States Patent
He et al.

(10) Patent No.: US 11,479,662 B2
(45) Date of Patent: Oct. 25, 2022

(54) POLYETHYLENE COMPOSITION WITH TREEING RETARDANTS

(71) Applicant: Dow Global Technologies LLC, Midland, MI (US)

(72) Inventors: Chao He, Shanghai (CN); Yabin Sun, Shanghai (CN); Jeffrey M. Cogen, Flemington, NJ (US); Timothy J. Person, Pottstown, PA (US); Hongyu Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 310 days.

(21) Appl. No.: 16/620,002

(22) PCT Filed: Aug. 29, 2017

(86) PCT No.: PCT/CN2017/099376
§ 371 (c)(1),
(2) Date: Dec. 6, 2019

(87) PCT Pub. No.: WO2019/041113
PCT Pub. Date: Mar. 7, 2019

(65) Prior Publication Data
US 2021/0189108 A1    Jun. 24, 2021

(51) Int. Cl.
| | |
|---|---|
| *C08L 23/06* | (2006.01) |
| *C08K 5/00* | (2006.01) |
| *H01B 3/44* | (2006.01) |
| *H01B 3/46* | (2006.01) |
| *C08K 5/14* | (2006.01) |
| *C08L 23/08* | (2006.01) |
| *C08L 53/00* | (2006.01) |
| *C08L 83/04* | (2006.01) |

(52) U.S. Cl.
CPC .............. *C08L 23/06* (2013.01); *C08K 5/005* (2013.01); *C08K 5/14* (2013.01); *C08L 23/08* (2013.01); *H01B 3/441* (2013.01); *H01B 3/46* (2013.01); *C08L 53/00* (2013.01); *C08L 83/04* (2013.01); *C08L 2201/08* (2013.01); *C08L 2203/202* (2013.01)

(58) Field of Classification Search
None
See application file for complete search history.

(56) References Cited

U.S. PATENT DOCUMENTS

| | | |
|---|---|---|
| 4,018,852 A | 4/1977 | Schober |
| 4,372,988 A | 2/1983 | Bahder |
| 4,501,688 A | 2/1985 | Braus |
| 4,876,147 A | 10/1989 | Schlag et al. |
| 5,034,278 A | 7/1991 | Turbett |
| 5,246,783 A | 9/1993 | Spenadel et al. |
| 5,266,627 A | 11/1993 | Meverden et al. |
| 5,296,534 A | 3/1994 | Senuma et al. |
| 5,346,961 A | 9/1994 | Shaw et al. |
| 5,372,841 A | 12/1994 | Kleyer et al. |
| 6,277,925 B1 | 8/2001 | Biswas et al. |
| 6,496,629 B2 | 12/2002 | Ma et al. |
| 6,714,707 B2 | 3/2004 | Rossi et al. |
| 2004/0217329 A1 | 11/2004 | Easter |
| 2010/0101823 A1* | 4/2010 | Eaton ............... H01B 3/441 252/511 |
| 2011/0094772 A1* | 4/2011 | Caronia ............ H01B 13/148 264/1.29 |

FOREIGN PATENT DOCUMENTS

| | | |
|---|---|---|
| CN | 101367972 | 2/2009 |
| CN | 106590010 A | 4/2017 |
| EP | 0215477 A1 | 3/1987 |
| EP | 0334992 | 10/1989 |
| JP | 56109401 | 8/1981 |
| WO | 2009042364 | 4/2009 |
| WO | 2016200600 | 12/2016 |

OTHER PUBLICATIONS

Braun et al. Certification of Equivalent Spherical Diameters of Silica Nanoparticles in Water, 2011, Institute for Reference Materials and Measurements.

* cited by examiner

*Primary Examiner* — Tae H Yoon

(57) ABSTRACT

A polyethylene composition comprising (A) an ethylene-based (co) polymer, (B) a styrenic unit-containing copolymer, and (C) a polyorganosiloxane. Also a method of making the composition; a crosslinked polyethylene product made by curing the composition; manufactured articles comprising a shaped form of the inventive composition or product; and methods of using the inventive composition, product, or articles.

10 Claims, No Drawings

POLYETHYLENE COMPOSITION WITH TREEING RETARDANTS

FIELD

Compositions of polyethylene and treeing retardants, and related aspects.

INTRODUCTION

Insulated electrical conductors typically comprise a conductive core covered by an insulation layer. The conductive core may be solid or stranded (e.g., a bundle of wires). Some insulated electrical conductors may also contain one or more additional elements such as semiconducting layer(s) and/or a protective jacket (e.g., wound wire, tape, or sheath). Examples are coated metal wires and electrical power cables, including those for use in low voltage ("LV", >0 to <5 kilovolts (kV)), medium voltage ("MV", 5 to <69 kV), high voltage ("HV", 69 to 230 kV) and extra-high voltage ("EHV", >230 kV) electricity-transmitting/distributing applications. Evaluations of power cables may use AEIC/ICEA standards and/or IEC test methods.

Polyethylene compositions are mentioned in CN 101367972A; JP 56-109401A (1981); U.S. Pat. Nos. 4,372,988; 4,501,688; 4,876,147; and 5,372,841.

SUMMARY

We recognized a problem that hurts the performance of power cables operating at higher voltages and exposed to moisture. Under these conditions, water-tree growth can occur over time in the insulation layer, which can lead to electrical treeing therein, which in turn can ultimately lead to failure of the insulation layer. The time to reach such failure can be lengthened, and thus reliability of power delivery increased and maintenance costs decreased, by using a more resilient material in the insulation layer. Past material solutions that were proposed for MV power cables, however, result in unacceptable dissipation factor if used at higher voltages (HV or EHV power cables).

A satisfactory technical solution to this problem was not obvious. We found that using more of a water-tree retardant additive does not necessarily increase inhibition of water-treeing and may worsen it. Further, additional retardant can cause other problems such as bloom or sweat out of the water-tree retardant (i.e., migration of the water-tree retardant from an interior portion of the insulation layer to a surface of the insulation layer). Also, many additives that inhibit water treeing cause other problems such as large increases in dissipation factor. A problem to be solved then is to formulate a composition that better inhibits water-tree growth and electrical-tree growth without migration and without a large increase in dissipation factor.

Our technical solution to this problem includes a polyethylene composition comprising (A) an ethylene-based (co)polymer; (B) a styrenic unit-containing copolymer; and (C) a polyorganosiloxane ("inventive composition"). Also inventive are a method of making the inventive composition; a crosslinked polyethylene product made by curing the inventive composition ("inventive product"); manufactured articles comprising a shaped form of the inventive composition or product ("inventive articles"); and methods of using the inventive composition, product, or articles.

The inventive composition, product, and articles are useful in electricity transmitting applications and other unrelated applications such as containers or vehicle parts.

DETAILED DESCRIPTION

The Summary and Abstract are incorporated here by reference. Certain inventive embodiments are described below as numbered aspects for easy cross-referencing.

Aspect 1. A polyethylene composition comprising from 50 to 98.9 weight percent (wt %) of (A) an ethylene-based (co)polymer; from 1 to 20.0 wt % of (B) a styrenic unit-containing copolymer; and from 0.1 to 10 wt % of (C) a polyorganosiloxane.

Aspect 2. The polyethylene composition of aspect 1 comprising from 50.0 to 98.9 wt % of the (A) ethylene-based (co)polymer; from 1.0 to 15.4 wt % of the (B) styrenic unit-containing copolymer; and from 0.1 to less than 1.5 wt % of the (C) polyorganosiloxane.

Aspect 3. The polyethylene composition of aspect 1 or 2 wherein the total amount of the (B) styrene copolymer and (C) polyorganosiloxane is from 1.1 to 16 wt % of the polyethylene composition.

Aspect 4. The polyethylene composition of any one of aspects 1 to 3, characterized by any one of limitations (i) to (iii): (i) the polyethylene composition has a weight/weight ratio of the (B) styrenic unit-containing copolymer to the (C) polyorganosiloxane from 2 to 40; (ii) the (B) styrenic unit-containing copolymer is a linear polystyrene-ethylene/butylene-polystyrene triblock copolymer; and (iii) both (i) and (ii). In some aspects the weight/weight ratio of (B)/(C) may be from 2 to 31, alternatively 3 to 19, alternatively from 5 to 16.

Aspect 5. The polyethylene composition of any one of aspects 1 to 4 further comprising from 0.05 to 2 wt % of (D) an antioxidant and no more than 98.85 wt % of the (A) ethylene-based (co)polymer.

Aspect 6. The polyethylene composition of any one of aspects 1 to 4 or aspect 5 further comprising from 0.1 to 3 wt % of (E) an organic peroxide and no more than 98.80 wt % or 98.75 wt %, respectively, of the (A) ethylene-based (co)polymer.

Aspect 7. The polyethylene composition of any one of aspects 1 to 5, wherein the polyethylene composition is free of (i.e., lacks) a cure agent (defined later).

Aspect 8. The polyethylene composition of any one of aspects 1 to 7, further comprising at least one additive chosen from: (F) a scorch retardant; (G) an alkenyl-functional coagent; (H) a nucleating agent; (I) a processing aid; (J) an extender oil; (K) carbon black; (L) nanoparticles; (M) a stabilizer (e.g., a compound that inhibits ultraviolet (UV) light-associated degradation). The at least one additive differs from constituents (A) to (E) in at least composition.

Aspect 9. The polyethylene composition of any one of aspects 1 to 8, characterized by an increase in water-tree length (WTL) of less than 14%, alternatively less than 13%, alternatively less than 9%, when measured according to the Water-Tree Growth Test Method using ASTM D6097, described later. In some aspects the increase in WTL is from greater than 0% to <14%, alternatively from 1% to <14%, alternatively from 4% to 14%, alternatively from 4% to <13%, alternatively from 4% to <9%, alternatively from 5% to 14%, alternatively from 5% to <13%, alternatively from 5% to <9%.

Aspect 10. The polyethylene composition of any one of aspects 1 to 9, characterized by a dissipation factor of less than 0.35%, alternatively less than 0.25%, alternatively less than 0.15%, alternatively less than 0.10%, when measured according to the Dissipation Factor Test Method, described later. In some aspects the dissipation factor is from greater than 0% to <0.35%, alternatively from 0.01% to <0.35%, alternatively from 0.014% to <0.35%, alternatively from 0.01% to <0.25%, alternatively from 0.01% to <0.15%, alternatively from 0.01% to <0.10%, alternatively from 0.015% to <0.25%, alternatively from 0.015% to <0.15%, alternatively from 0.015% to <0.10%.

Aspect 11. A method of making the polyethylene composition of any one of aspects 1 to 10, the method comprising mixing the (B) styrenic unit-containing copolymer and (C) polyorganosiloxane into a melt of the (A) ethylene-based (co)polymer to give the polyethylene composition as a melt blend comprising constituents (A), (B), and (C). In some aspects the method further comprises mixing one or more additives (e.g., one or more of the constituents (D) to (M)) into the melt of (A). The method may also comprises extruding the melt blend to give an extrudate of the polyethylene composition. In some aspects the method further comprises allowing the melt blend or extrudate to cool to give a solid blend or a solid extrudate, respectively.

Aspect 12. A crosslinked polyethylene product that is a product of curing the polyethylene composition of any one of aspects 1 to 10. In some aspects the polyethylene composition being cured comprises from 0.1 to 3 wt % of the (E) organic peroxide and no more than 98.80 wt % or 98.75 wt %, respectively, of the (A) ethylene-based (co)polymer.

Aspect 13. A manufactured article comprising a shaped form of the polyethylene composition of any one of aspects 1 to 10, the polyethylene composition made by the method of aspect 11, or the crosslinked polyethylene product of aspect 12. The shaped form of the manufactured article may cylindrical, helical, or irregular. In some aspects the manufactured article may be an insulation layer of an insulated electrical conductor of aspect 14 (below). In some aspects the manufactured article may be the insulated electrical conductor of aspect 14.

Aspect 14. An insulated electrical conductor comprising a conductive core and an insulation layer at least partially covering the conductive core, wherein at least a portion of the insulation layer comprises the polyethylene composition of any one of aspects 1 to 10, the polyethylene composition made by the method of aspect 11, or the crosslinked polyethylene product of aspect 12. The amount of the polyethylene composition in the insulation layer of the insulated electrical conductor may be a quantity that is effective for decreasing the water-tree length and/or decreasing the dissipation factor of the insulation layer. The insulation layer may be composed of a single layer, at least a portion of which is the inventive composition or product; or composed of multiple layers, at least one layer of which comprises the inventive composition or product. The insulated electrical conductor may be a coated wire or a power cable. The insulated electrical conductor is useful for electricity-transmitting/distributing applications, including low, medium, high, and ultra-high voltage applications.

Aspect 15. A method of conducting electricity, the method comprising applying a voltage across the conductive core of the insulated electrical conductor of aspect 14 so as to generate a flow of electricity through the conductive core. The applied voltage may be low (>0 to <5 kilovolts (kV)), medium (5 to <69 kV), high (69 to 230 kV), or extra-high (>230 kV).

The term "coagent" means a compound that enhances crosslinking, i.e., a curing coagent. Typical coagents are acyclic or cyclic compounds that contain carbon atoms in their respective backbone or ring substructure. Thus, the backbone or ring substructure of the conventional coagent is based on carbon (carbon-based substructure).

The term "(co)polymer" means homopolymer or copolymer. A homopolymer is a macromolecule composed of monomeric units derived from only one monomer and no comonomer. A copolymer is a macromolecule or collection of macromolecules having monomeric units, made by polymerizing a first monomer, and one or more different types of comonomeric units, made by polymerizing one or more different second or more monomers, referred to as comonomers. Monomers and comonomers are polymerizable molecules. A monomeric unit, also called a monomer unit or "mer", is the largest constitutional unit contributed by (derived from) a single monomer molecule to the structure of the macromolecule(s). A comonomeric unit, also called a comonomer unit or "comer", is the largest constitutional unit contributed by (derived from) a single comonomer molecule to the structure of the macromolecule(s). Each unit is typically divalent. A "bipolymer" is a copolymer made from a monomer and one comonomer. A "terpolymer" is a copolymer made from a monomer and two different comonomers. An ethylenic-based copolymer is such a copolymer wherein the monomeric units are derived from the monomer ethylene ($CH_2=CH_2$) and comprise on average per molecule, at least 50 weight percent, and the comonomeric units are derived from one or more comonomers described herein and comprise on average per molecule, from >0 to at most 50 weight percent, of the macromolecules.

The term "cure agent" means a radical-generating compound (in situ) that upon activation forms a free-radical and initiates or enhances crosslinking of macromolecules of the (A) ethylene-based (co)polymer. Activation of the cure agent may be achieved by subjecting the cure agent to heat or light. Examples of cure agents are peroxides, diazofunctional organic compounds, and 2,3-dimethyl-2,3-diphenylbutane. Examples of peroxides are hydrogen-organic peroxides of formula H—O—O—R and organic peroxides of formula R—O—O—R, wherein each R is independently a hydrocarbyl group.

The terms "curing" and "crosslinking" are used interchangeably herein to mean forming a crosslinked product (network polymer).

The term "ethylene-based (co)polymer" means a macromolecule containing from 50 percent to 100 wt % repeat units derived from $H_2C=CH_2$ (ethylenic repeat units) and from 50 to 0 wt %, respectively, of one or more comonomers described later. Examples of the one or more comonomers include ($C_3$-$C_{20}$)alpha-olefins, vinyl silanes, vinyl acetate, and alkyl acrylates. The ethylene-based (co)polymer, also called an ethylenic-based (co)polymer, may be a polyethylene homopolymer having 100 wt % ethylenic monomeric units and 0 wt % comonomeric units or an ethylene/comonomer copolymer having >50 to <100 wt % ethylenic monomeric units and >0 to <50 wt %, alternatively 1 to <50 wt %, alternatively 5 to <50 wt % comonomeric units, wherein the comonomeric units are derived from the one or more comonomers.

The term "(meth)acrylate" includes acrylate, methacrylate, and a combination thereof. The (meth)acrylate may be unsubstituted.

The polyethylene composition. A single phase or multiphase, uniform or non-uniform, continuous phase or discontinuous phase, crosslinkable formulation comprising or containing constituents (A), (B), and (C). In the polyethylene composition the constituents (B) styrenic unit-containing copolymer and (C) polyorganosiloxane may be dispersed in macromolecules of (A) ethylene-based (co)polymer. In some aspects the polyethylene composition may further contain one, two, or more optional ingredients or additives (D) to (M). The total weight of the polyethylene composition is 100.00 wt %. The term "polyethylene composition" may be used interchangeably with "polyethylene formulation" or "ethylene-based (co)polymer-containing formulation".

The polyethylene composition may be made by a number of different ways. In some aspects the polyethylene composition may be made by mixing a melt of the (A) ethylene-based (co)polymer with the (B) styrenic unit-containing copolymer and (C) polyorganosiloxane, and any optional constituents (e.g., any zero, one or more of constituents (D) to (M)) to give the polyethylene composition as an admixture of constituents (A), (B), (C), and the any optional constituents. The mixing may comprise compounding, kneading, or extruding. To facilitate mixing one or more constituents (e.g., (B), (C), additives (D), (E), etc.) may be provided in the form of an additive masterbatch in a portion of (A) or as a dispersion of additive in a carrier resin other than (A). The carrier resin may be a polypropylene polymer.

Another way the polyethylene composition may be made is by contacting the (B) styrenic unit-containing copolymer and (C) polyorganosiloxane, and optionally zero, one or more of any optional constituents (e.g., (D) antioxidant and/or (E) organic peroxide), with an unmelted form of the (A) ethylene-based (co)polymer to give the polyethylene composition as an admixture of constituents (A), (B), (C) and the any optional constituents. The contacting may comprise soaking, imbibing or injecting. Constituents (B) and (C) and any optional constituent(s) independently may be combined by compounding, extruding, imbibing, injecting, kneading, or soaking. The mixing or contacting may be carried out at a temperature from about 20° to 100° C. for 0.1 to 100 hours, e.g., 60° to 80° C. for 0.1 to 24 hours. Higher temperatures may be used for the mixing or contacting with the proviso that any (E) organic peroxide is not subjected to its decomposition temperature. Thereafter if desired, the admixture may be cooled to a temperature below the (E) organic peroxide decomposition temperature before being mixed or contacted with (E) organic peroxide. If desired the polyethylene composition may be cooled to a storage temperature (e.g., 23° C.) and stored for a period of time of 1 hour, 1 week, 1 month, or longer.

The polyethylene composition may be prepared as a one-part formulation, alternatively a multi-part formulation such as a two-part formulation, alternatively a three-part formulation. The one-part formulation contains all the constituents of the embodiment of the polyethylene composition. The multi-part formulation contains multiple parts with different ones or amounts of the constituents of the embodiment of the polyethylene composition in different parts. If desired, the different parts of the multi-part formulation may be combined to give the one-part formulation. There is no inherent reason why any combination of constituents cannot be included in either part or parts of these formulations.

The polyethylene composition may be in a divided solid form or in continuous form. The divided solid form may comprise granules, pellets, powder, or a combination of any two or more thereof. The continuous form may be a molded part (e.g., blow molded part) or an extruded part (e.g., an insulation layer of an insulated electrical conductor). The polyethylene composition may be crosslinkable by irradiation curing or organic peroxide/heat curing.

The polyethylene composition may be free of any carbon-containing backbone-based polymer other than constituents (A), (B), and any carbon-containing backbone-based polymer embodiments of optional constituents (D) to (M). The polyethylene composition may be free of at least one of, alternatively each of a polypropylene carrier resin; a polypropylene homopolymer; a propylene/ethylene copolymer containing 50 to <100 wt % propylenic monomeric units and 50 to 0 wt % ethylenic comonomeric units; and a propylene/ethylene/diene (EPDM) copolymer containing 50 to <100 wt % propylenic monomeric units, 49 to >0 wt % of ethylenic units, and 20 to 1 wt % dienic comonomeric units. Alternatively the polyethylene composition may further comprise a polypropylene carrier resin; a polypropylene homopolymer containing 99 to 100 wt % propylenic monomeric units; a propylene/ethylene copolymer containing 50 to <100 wt % propylenic monomeric units and 50 to 0 wt % ethylenic comonomeric units; or a propylene/ethylene/diene (EPDM) copolymer containing 50 to <100 wt % propylenic monomeric units, 49 to >0 wt % of ethylenic units, and 20 to 1 wt % dienic comonomeric units. The diene used to make the dienic comonomeric units may be 1,3-butadiene, 1,5-hexadiene, 1,7-octadiene, ethylidene norbornene, dicyclopentadiene, or vinyl norbornene.

The constituent (A) ethylene-based (co)polymer: a single phase or multiphase, uniform or non-uniform, continuous phase or discontinuous phase, crosslinkable macromolecule composed of repeat units made from ethylene monomer and optionally one or more olefin-functional comonomers, wherein the macromolecule has a backbone consisting essentially of, or consisting of carbon atoms, or a collection of such crosslinkable macromolecules, which yield a network structure upon being crosslinked. The (A) may be a polyethylene homopolymer containing repeat units derived from ethylene; or an ethylene/alpha-olefin interpolymer, also referred to as a copolymer, containing repeat units derived from ethylene and repeat units derived from an alpha-olefin comonomer, which is different than ethylene; or an ethylene/unsaturated carboxylic ester copolymer comprising from 51 to 99.9 wt % ethylenic monomeric units and from 49 to 0.1 wt % unsaturated carboxylic ester comonomeric units; or an ethylene/olefin-functional hydrolyzable silane copolymer comprising from 51 to 99.9 wt % ethylenic monomeric units and from 49 to 0.1 wt % olefin-functional hydrolyzable silane comonomeric units. Interpolymer includes bipolymers, terpolymers, etc.

The (A) ethylene-based (co)polymer may be a polyethylene homopolymer containing 99 to 100 wt % ethylenic monomeric units. The polyethylene homopolymer may be high density polyethylene (HDPE) homopolymer made by coordination polymerization or a low density polyethylene (LDPE) homopolymer made by radical polymerization.

Alternatively, the (A) ethylene-based (co)polymer may be an ethylene/alpha-olefin copolymer containing 50 to <100 wt % ethylenic monomeric units and 50 to 0 wt % ($C_3$-$C_{20}$) alpha-olefin-derived comonomeric units. The ethylene/alpha-olefin copolymer embodiment of (A) ethylene/alpha-olefin copolymer may be a linear low density polyethylene (LLDPE), medium density polyethylene (MDPE), or high density polyethylene (HDPE). Alternatively, the polyethylene polymer may be a low density polyethylene (LDPE). The ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an alpha-olefin content of less than 50 wt %, less than 45 wt %, less than 40 wt %, or less than 35 wt % based on the entire interpolymer weight. Illustrative ethylene/α-olefin interpolymers are ethylene/propylene, ethylene/1-butene, ethylene/1-hexene, ethylene/1-octene, ethylene/diene containing from 20 to 1 wt % diene comonomeric units, ethylene/propylene/1-octene, ethylene/propylene/1-butene, ethylene/1-butene/1-octene, ethylene/ propylene/diene (EPDM) containing 50 to 100 wt % ethylene monomeric units, 49 to >0 wt % of propylene comonomeric units, and 20 to 1 wt % diene comonomeric units. The diene used to make the diene comonomeric units in the ethylene/diene copolymer or in EPDM independently may be 1,3-butadiene, 1,5-hexadiene, 1,7-octadiene, ethylidene norbornene, dicyclopentadiene, vinyl norbornene, or a combination of any two or more thereof.

The $(C_3-C_{20})$alpha-olefin of the ethylene/alpha-olefin copolymer aspect of the (A) ethylene-based (co)polymer may be a compound of formula (I): $H_2C=C(H)-R$ (I), wherein R is a straight chain $(C_1-C_{18})$alkyl group. $(C_1-C_{18})$ alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the $(C_3-C_{20})$alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene. Alternatively, the alpha-olefin may have a cyclic structure such as cyclohexane or cyclopentane, resulting in an α-olefin such as 3-cyclohexyl-1-propene (allyl cyclohexane) and vinyl cyclohexane. The $(C_3-C_{20})$alpha-olefin may be used as a comonomer with ethylene monomer.

The ethylene/unsaturated carboxylic ester copolymer embodiment of the (A) ethylene-based (co)polymer is made by copolymerizing ethylene monomer and at least one unsaturated carboxylic ester comonomer. Each unsaturated carboxylic ester comonomer may independently have hydrogen atoms and from 3 to 20 carbon atoms per molecule, i.e., be a $(C_3-C_{20})$unsaturated carboxylic ester comonomer. In some aspects the unsaturated carboxylic ester comonomer may be a vinyl $(C_2-C_8)$carboxylate and the ethylene/unsaturated carboxylic ester copolymer is an ethylene-vinyl $(C_2-C_8)$carboxylate copolymer, which may have a vinyl $(C_2-C_8)$carboxylate comonomeric content from >0 to <3.5 wt %, alternatively from >0 to 3.0 wt %, alternatively from >0 to 2.0 wt %, alternatively from 0.5 to 2.0 wt % based on total weight of the ethylene-vinyl $(C_2-C_8)$carboxylate copolymer. In some aspects the vinyl $(C_2-C_8)$carboxylate is a vinyl ester of a carboxylic acid anion having from 2 to 8 carbon atoms, alternatively 2 to 4 carbon atoms. The vinyl $(C_2-C_8)$carboxylate may be a vinyl $(C_2-C_4)$carboxylate such as vinyl acetate, vinyl propionate, or vinyl butanoate and the ethylene/unsaturated carboxylic ester copolymer may be an ethylene-vinyl $(C_2-C_4)$carboxylate bipolymer, alternatively an ethylene-vinyl acetate (EVA) bipolymer, alternatively an ethylene-vinyl propionate bipolymer, alternatively an ethylene-vinyl butanoate bipolymer. The EVA bipolymer consists essentially of ethylene-derived monomeric units and vinyl acetate-derived comonomeric units. The vinyl acetate comonomeric unit content of the EVA bipolymer may be from >0 to <3.5 wt %, alternatively from >0 to 3.0 wt %, alternatively from >0 to 2.0 wt %, alternatively from 0.5 to 2.0 wt % based on total weight of the EVA bipolymer. The wt % values are on average per molecule of the EVA. Alternatively or additionally, the (A) (e.g., EVA bipolymer) may have a melt index (190° C., 2.16 kg) of from 2 to 60 g/10 min., alternatively 5 to 40 g/10 min. measured by ASTM D1238-04.

In some aspects the unsaturated carboxylic ester comonomer used to make the ethylene/unsaturated carboxylic ester copolymer embodiment of the (A) ethylene-based (co)polymer may be a $(C_1-C_8)$alkyl (meth)acrylate and the ethylene/unsaturated carboxylic ester copolymer is an ethylene-$(C_1-C_8)$alkyl (meth)acrylate copolymer (EAA), which may have a $(C_1-C_8)$alkyl (meth)acrylate comonomeric content from >0 to <3.5 wt %, alternatively from >0 to 3.0 wt %, alternatively from >0 to 2.0 wt %, alternatively from 0.5 to 2.0 wt %, based on total weight of the ethylene-$(C_1-C_8)$alkyl (meth)acrylate copolymer. In some aspects the $(C_1-C_8)$alkyl may be a $(C_1-C_4)$alkyl, $(C_5-C_8)$alkyl, or $(C_2-C_4)$alkyl. The EAA consists essentially of ethylene-derived monomeric units and one or more different types of $(C_1-C_8)$alkyl (meth)acrylate-derived comonomeric units such as ethyl acrylate and/or ethyl methacrylate comonomeric units. The $(C_1-C_8)$alkyl may be methyl, ethyl, 1,1-dimethylethyl, butyl, or 2-ethylhexyl. The (meth)acrylate may be acrylate, methacrylate, or a combination thereof. The $(C_1-C_8)$alkyl (meth)acrylate may be ethyl acrylate and the EAA may be ethylene-ethyl acrylate copolymer (EEA) or the $(C_1-C_8)$alkyl (meth)acrylate may be ethyl methacrylate and the EAA may be ethylene-ethyl methacrylate copolymer (EEMA). The ethyl acrylate or ethyl methacrylate comonomeric unit content of EEA or EEMA, respectively, may independently be from >0 to <3.5 wt %, alternatively from >0 to 3.0 wt %, alternatively from >0 to 2.0 wt %, alternatively from 0.5 to 2.0 wt % based on total weight of the EEA or EEMA bipolymer.

In some aspects the olefin-functional silane comonomer used to make the ethylene/olefin-functional silane copolymer embodiment of the (A) ethylene-based (co)polymer may the hydrolyzable silane monomer of paragraph [0019] of WO 2016/200600 A1 (PCT/US16/033879 filed May 24, 2016) to Chaudhary; or of U.S. Pat. No. 5,266,627 to Meverden et al. The olefin-functional hydrolyzable silane may be grafted (post-reactor) onto the copolymer embodiment of the (A). Alternatively, the olefin-functional hydrolyzable silane may be copolymerized with ethylene and the comonomer to directly make the copolymer embodiment containing hydrolyzable silyl groups. In some aspects the olefin-functional hydrolyzable silane is vinyltrimethoxysilane (VTMS), vinyltriethoxysilane (VTES), vinyltriacetoxysilane, or gamma-(meth)acryloxy propyl trimethoxy silane and the hydrolyzable silyl groups are 2-trimethoxysilylethyl, 2-triethoxysilylethyl, 2-triacetoxysilylethyl, or 3-trimethoxysilylpropyloxycarbonylethyl or 3-trimethoxysilylpropyloxycarbonylpropyl.

The (A) ethylene-based (co)polymer may be a blend of two or more different ethylene-based (co)polymers or a reactor product of polymerization reactions with two or more different catalysts. The (A) ethylene-based (co)polymer may be made in two or more reactors, such as ELITE™ polymers from The Dow Chemical Company.

The (A) ethylene-based (co)polymer may be made by any suitable process, many of which are well-known in the art. Any conventional or hereafter discovered production process for producing polyethylene (co)polymers may be employed for preparing the (A). Typically the production process comprises one or more polymerization reactions. For example, the LDPE may be prepared using a high pressure polymerization process. Alternatively, the LDPE may be prepared using a coordination polymerization process conducted using one or more polymerization catalysts such as Ziegler-Natta, chromium oxide, metallocene, postmetallocene catalysts. Suitable temperatures are from 0° to 250° C., or 30° or 200° C. Suitable pressures are from atmospheric pressure (101 kPa) to 10,000 atmospheres (approximately 1,013 MegaPascals ("MPa")). In most polymerization reactions, the molar ratio of catalyst to polymerizable olefins (monomer/comonomer) employed is from $10^{-12}$:1 to $10^{-1}$:1, or from $10^{-9}$:1 to $10^{-5}$:1.

The amount of the (A) ethylene-based (co)polymer in the polyethylene composition may be from 75 to 98.9 wt %, alternatively from 80 to 95 wt %, alternatively from 80 to 90 wt %, all based on the total weight of the polyethylene composition.

Constituent (B): styrenic unit-containing copolymer. A macromolecule or collection of macromolecules having styrenic units, made by polymerizing styrene monomer, and comonomeric units chosen from ethylenic units, ($C_3$-$C_{20}$) alpha-olefinic units, dienic units, and a combination of at least two of ethylenic, ($C_3$-$C_{20}$)alpha-olefinic, and dienic units. The comonomeric units are made by copolymerizing at least one olefinic hydrocarbon chosen from ethylene, a ($C_3$-$C_{20}$)alpha-olefin, a diene, and a combination of at least two of ethylene, a ($C_3$-$C_{20}$)alpha-olefin, and a diene. Styrene is also known as ethenylbenzene, vinylbenzene, and phenylethene and is of formula $C_8H_8$. The ($C_3$-$C_{20}$)alpha-olefin used to make the ($C_3$-$C_{20}$)alpha-olefinic units of embodiments of (B) independently may be as described above for the ad rem embodiments of the (A) ethylene-based (co) polymer, which description is hereby incorporated here by reference. The ($C_3$-$C_{20}$)alpha-olefin may be a ($C_3$-$C_{10}$)alpha-olefin, alternatively a ($C_4$-$C_8$)alpha-olefin, alternatively 1-butene, alternatively 1-hexene, alternatively 1-octene. The diene may be a hydrocarbon compound having two carbon-carbon double bonds and a molecular weight (MW) of 54 to 500 grams per mole. The diene may be a combination of from 1 to 3 dienes; alternatively 1 or 2 dienes; alternatively 1 diene. Each diene may independently be a ($C_4$-$C_{20}$)diene. Examples of suitable ($C_4$-$C_{20}$)dienes are ($C_4$-$C_{12}$)dienes; ($C_4$-$C_{10}$)dienes; ($C_4$-$C_8$)dienes; ($C_{10}$-$C_{20}$)dienes; an ethylidene norbornene; a dicyclopentadiene; a vinyl norbornene; and alpha,omega-($C_4$-$C_{20}$)dienes; Alpha-omega-($C_4$-$C_{20}$) dienes are linear hydrocarbons containing two carbon-carbon double bonds (C=C), wherein each C=C is at a different terminal carbon atom. Each alpha,omega-($C_4$-$C_{20}$) diene may be independently chosen from 1,3-butadiene, 1,4-pentadiene, 1,5-hexadiene, 1,6-heptadiene, 1,7-octadiene, 1,8-nonadiene, and 1,9-decadiene; alternatively 1,3-butadiene; alternatively 1,4-pentadiene; alternatively 1,5-hexadiene; alternatively 1,6-heptadiene; alternatively 1,7-octadiene; alternatively 1,8-nonadiene; alternatively 1,9-decadiene. The diene used to make the dienic comonomeric units may be 1,3-butadiene, 1,5-hexadiene, 1,7-octadiene, ethylidene norbornene, dicyclopentadiene, or vinyl norbornene. In some aspects the diene is 1,3-butadiene. In some aspects the (B) is a styrene/butadiene rubber. In some aspects the (B) is a block copolymer having at least one polystyrene block and at least one dienic block based on units derived from polymerizing an alpha,omega-($C_4$-$C_{20}$) diene (e.g., 1,3-butadienic units). The (B) may be a linear copolymer, alternatively a linear block copolymer, alternatively a linear block copolymer having from 3 to 10 blocks (e.g., 3, 4, or 5 blocks) wherein the end blocks are polystyrene blocks and the polystyrene end blocks are bonded to poly(diene) blocks, alternatively a linear triblock copolymer, alternatively a linear triblock copolymer having at least one styrenic block (polystyrene block) and at least one dienic block (poly(diene) block) or hydrogenated dienic block (saturated poly(diene) block). In some aspects the (B) is a linear triblock copolymer having two polystyrene blocks and an alpha,omega-($C_4$-$C_{20}$)dienic block or a partially or completely hydrogenated alpha,omega-($C_4$-$C_{20}$)dienic block. In some aspects the (B) is a linear polystyrene-ethylene/butylene-polystyrene triblock copolymer, which is also known as a "styrene-ethylene/butylene-styrene block copolymer" or "SEBS". The ethylene/butylene block of the SEBS is saturated, i.e., free of C=C bonds. It is made by well-known methods of completely hydrogenating a linear polystyrene-poly(1,3-butadiene)-polystyrene triblock copolymer, which is also known as a "styrene-butadiene-styrene triblock copolymer" or "SBS", to give the SEBS as a product. The ethylene/butylene block of the SEBS contains a combination of butane-1,4-diyl units and butane-1,2-diyl units. These saturated units are the product of completely hydrogenating but-2-ene-1,4-diyl units and but-3-ene-1,2-diyl units that are present in SBS and which are formed during polymerization of 1,3-butadiene depending on whether different molecules of 1,3-butadiene react in a 1,4- or 1,2-sense. During the hydrogenation of SBS, intermediate triblock copolymers are formed wherein some of the C=C bonds in the poly(1,3-butadiene) block of SBS have been hydrogenated and other C=C bonds in the poly(1,3-butadiene) block of SBS have not been hydrogenated. These intermediate triblock copolymers are referred to herein as partially hydrogenated SBS. Hydrogenation conditions for hydrogenating SBS may be controlled in such a way, or the hydrogenation reaction may be stopped before completion, so as to yield partially hydrogenated SBS instead of, or in addition to, SEBS. In some aspects the (B) is SEBS, SBS, partially hydrogenated SBS, or a combination of at least two of SEBS, SBS, and partially hydrogenated SBS. In some aspects the (B) is SEBS, alternatively the (B) is SBS, alternatively the (B) is partially hydrogenated SBS, alternatively the (B) is a combination of SEBS and partially hydrogenated SBS, alternatively the (B) is a combination of SBS and partially hydrogenated SBS, alternatively the (B) is a combination (e.g., blend) of SEBS and SBS, alternatively the (B) is a combination of SEBS, SBS, and partially hydrogenated SBS. The (B) styrenic unit-containing copolymer may have a styrenic unit content of from 15 to 35 wt %, alternatively from 15 to 25 wt %, alternatively from 25 to 35 wt %, alternatively from 18 to 32 wt %, alternatively from 20.0 to 30.0 wt %, all based on total weight of the (B) styrenic unit-containing copolymer; and a melt index from 0.01 to 30 grams per 10 minutes (g/10 min.), alternatively from 0.01 to 26 g/10 min., alternatively from 0.01 to 25.0 g/10 min., alternatively from 0.05 to 15 g/10 min.; alternatively from 0.1 to 25 g/10 min.; alternatively from 1 to 25 g/10 min. The styrenic content of (B) is determined according to ISO 5478, Third edition (2006), *Rubber—Determination of styrene content—Nitration method*. When the styrenic content is in the form of a polystyrene block of a block copolymer embodiment of (B), such as SEBS or SBS, that is when the styrenic units are consecutive and not interrupted by comonomeric units, the styrenic content may be referred to herein as polystyrene content. The SEBS, SBS and partially hydrogenated SBS independently may have a styrenic unit content of from 15 to 25 wt %, alternatively 16 to 24 wt %, alternatively 18 to 22 wt %, alternatively 19 to 21 wt %, alternatively 19.5 to 20.49 wt %, based on total weight of the (B). For (B), melt index is determined according to ASTM D1238-04 at 230° C. under a load of 2.16 kg. The dienic content may be from 85 to 65 wt %, alternatively from 85 to 75 wt %, alternatively from 75 to 65 wt %, alternatively from 82 to 68 wt %, alternatively from 80.0 to 70.0 wt %, respectively, all based on total weight of the (B) styrenic unit-containing copolymer. Examples of (B) are KRATON G1643 M Polymers (Kraton Corporation, Kraton Polymers U.S. LLC, Houston, Tex., USA), which is an embodiment of a linear polystyrene-ethylene/butylene-polystyrene triblock copolymer or SEBS having a melt index (ASTM D1238-04, 230° C., 2.16 kg) of 14.0 to 25.0 g/10 min., e.g., 18 g/10 min.; and a polystyrene content of 20 wt % based on total weight of the KRATON G1643 M Polymer. The (B) may be a linear styrene/ethylene/butylene triblock copolymer having a melt index (ASTM D1238-04, 230° C., 2.16 kg) of 18 g/10 min. and a polystyrene content of 20 wt % based on total weight of (B).

Constituent (C): polyorganosiloxane. The polyorganosiloxane is an organo-functional siloxane polymer of formula (I): $[(R^1)_3SiO_{1/2}]_m[(R^2)_2SiO_{2/2}]_d[R^3SiO_{3/2}]_t[SiO_{4/2}]_q$ (I), wherein subscript m is from 0 to 0.3 and represents a mole fraction of the M units of formula $[(R^1)_3SiO_{1/2}]$, if any, in the polyorganosiloxane; subscript d is from 0 to 0.99 and represents a mole fraction of the D units of formula $[(R^2)_2SiO_{2/2}]$, if any, in the polyorganosiloxane; subscript t is from 0 to 0.99 and represents a mole fraction of the T units of formula $[R^3SiO_{3/2}]$, if any, in the polyorganosiloxane; and subscript q is from 0 to 0.1 and represents a mole fraction of the Q units of formula $[SiO_{4/2}]$, if any, in the polyorganosiloxane; wherein the sum m+d+t+q=1.00; and wherein each of $R^1$, $R^2$, and $R^3$ is independently H; a ($C_1$-$C_{12}$)organoheteryl (e.g., ($C_1$-$C_6$)alkoxy); a ($C_1$-$C_{12}$)hydrocarbyl (e.g., a ($C_1$-$C_2$)alkyl, ($C_2$-$C_{12}$)alkenyl, ($C_2$-$C_{12}$)alkynyl, ($C_3$-$C_{12}$) cycloalkyl, ($C_6$-$C_{12}$)aryl, or ($C_7$-$C_{12}$)aralkyl); a ($C_1$-$C_{12}$) heterohydrocarbyl (e.g., diethylaminopropyl or glycidyloxy). In some aspects each of $R^1$, $R^2$, and $R^3$ is independently a ($C_1$-$C_{12}$)hydrocarbyl; alternatively ($C_1$-$C_{12}$)alkyl, ($C_2$-$C_{12}$)alkenyl, or ($C_6$-$C_{12}$)aryl; alternatively ($C_1$-$C_{12}$)alkyl or ($C_2$-$C_{12}$)alkenyl; alternatively ($C_1$-$C_{12}$)alkyl or ($C_6$-$C_{12}$)aryl; alternatively ($C_1$-$C_{12}$)alkyl; alternatively ($C_1$-$C_4$)alkyl; alternatively methyl, ethyl, a propyl, or a butyl; alternatively methyl. In some aspects the (C) polyorganosiloxane is a polydiorganosiloxane (a compound of formula (I) wherein each of $R^1$, $R^2$, and $R^3$ is independently not H); alternatively a polydimethylsiloxane. The polydimethylsiloxane may be a compound of formula (I)-(A): $[(R^1)_3SiO_{1/2}]_m[(R^2)_2SiO_{2/2}]_d$ (I)-(A), wherein each of subscripts m and d is as defined above and each $R^1$ and $R^2$ is methyl.

The optional constituent (D) antioxidant. The (D) antioxidant functions to provide antioxidizing properties to the polyethylene composition and/or peroxide-cured semiconducting product. Examples of suitable (D) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); and distearyl thiodipropionate ("DSTDP"). In some aspects (D) is bis(4-(1-methyl-1-phenylethyl)phenyl) amine (e.g., NAUGARD 445, which is commercially available from Addivant, Danbury, Conn., U.S.A.). In some aspects the polyethylene composition and crosslinked polyethylene product is free of (D). When present, the (D) may be 0.01 to 1.5 wt %, alternatively 0.05 to 1.2 wt %, alternatively 0.1 to 1.0 wt % of the polyethylene composition.

The optional constituent (E): organic peroxide. A molecule containing carbon atoms, hydrogen atoms, and two or more oxygen atoms, and having at least one —O—O— group, with the proviso that when there are more than one —O—O— group, each —O—O— group is bonded indirectly to another —O—O— group via one or more carbon atoms; or collection of such molecules. The (E) organic peroxide may be added to the polyethylene composition if curing of the polyethylene composition is desired, especially curing comprising heating the polyethylene composition comprising constituents (A), (B), (C) and (E) to a temperature at or above the (E) organic peroxide's decomposition temperature. The (E) organic peroxide may be a monoperoxide of formula $R^O$—O—O—$R^O$, wherein each $R^O$ independently is a ($C_1$-$C_{20}$)alkyl group or ($C_6$-$C_{20}$)aryl group. Each ($C_1$-$C_{20}$)alkyl group independently is unsubstituted or substituted with 1 or 2 ($C_6$-$C_{12}$)aryl groups. Each ($C_6$-$C_{20}$) aryl group is unsubstituted or substituted with 1 to 4 ($C_1$-$C_{10}$)alkyl groups. Alternatively, the (E) may be a diperoxide of formula $R^O$—O—O—R—O—O—$R^O$, wherein R is a divalent hydrocarbon group such as a ($C_2$-$C_{10}$)alkylene, ($C_3$-$C_{10}$)cycloalkylene, or phenylene, and each $R^O$ is as defined above. The (E) organic peroxide may be bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis (1,1-dimethylethylperoxy) valeric acid; butyl ester; 1,1-bis (1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; or di(isopropylcumyl) peroxide; or dicumyl peroxide. The (E) organic peroxide may be dicumyl peroxide. In some aspects only a blend of two or more (E) organic peroxides is used, e.g., a 20:80 (wt/wt) blend of t-butyl cumyl peroxide and bis(t-butyl peroxy isopropyl)benzene (e.g., LUPEROX D446B, which is commercially available from Arkema). In some aspects at least one, alternatively each (E) organic peroxide contains one —O—O— group. In some aspects the polyethylene composition and crosslinked polyethylene product is free of (E). When present, the (E) organic peroxide may be 0.05 to 3.0 wt %, alternatively 0.1 to 3 wt %, alternatively 0.5 to 2.5 wt % of the polyethylene composition. Typically when the polyethylene composition further comprises both the (D) antioxidant and (E) organic peroxide, the weight/weight ratio of (D) antioxidant to (E) organic peroxide is less than 2 ((D)/(E) (wt/wt)<2).

The optional constituent (F) scorch retardant. A molecule that inhibits premature curing, or a collection of such molecules. Examples of a scorch retardant are hindered phenols; semi-hindered phenols; TEMPO; TEMPO derivatives; 1,1-diphenylethylene; 2,4-diphenyl-4-methyl-1-pentene (also known as alpha-methyl styrene dimer or AMSD); and allyl-containing compounds described in U.S. Pat. No. 6,277,925B1, column 2, line 62, to column 3, line 46. In some aspects the polyethylene composition and crosslinked polyethylene product is free of (K). When present, the (K) scorch retardant may be from 0.01 to 1.5 wt %, alternatively 0.05 to 1.2 wt %, alternatively 0.1 to 1.0 wt % of the polyethylene composition.

The optional constituent (G) alkenyl-functional coagent. A molecule that contains a backbone or ring substructure and one, alternatively two or more propenyl, acrylate, and/or vinyl groups bonded thereto, wherein the substructure is composed of carbon atoms and optionally nitrogen atoms, or a collection of such molecules. The (D) conventional coagent may be free of silicon atoms. The (G) alkenyl-functional coagent may be a propenyl-functional conventional coagent as described by any one of limitations (i) to (v): (i) (G) is 2-allylphenyl allyl ether; 4-isopropenyl-2,6-dimethylphenyl allyl ether; 2,6-dimethyl-4-allylphenyl allyl ether; 2-methoxy-4-allylphenyl allyl ether; 2,2'-diallyl bisphenol A; O,O'-diallyl bisphenol A; or tetramethyl diallyl-bisphenol A; (ii) (G) is 2,4-diphenyl-4-methyl-1-pentene or 1,3-diisopropenylbenzene; (iii) (G) is triallyl isocyanurate ("TAIC"); triallyl cyanurate ("TAC"); triallyl trimellitate ("TATM"); N,N,N',N',N'',N''-hexaallyl-1,3,5-triazine-2,4,6-triamine ("HATATA"; also known as $N^2,N^2,N^4N^4,N^6,N^6$-hexaallyl-1,3,5-triazine-2,4,6-triamine); triallyl orthoformate; pentaerythritol triallyl ether; triallyl citrate; or triallyl aconitate; (iv) (G) is a mixture of any two of the propenyl-functional coagents in (i). Alternatively, the (G) may be an acrylate-functional conventional coagent selected from trimethylolpropane triacrylate ("TMPTA"), trimethylolpropane trimethylacrylate ("TMPTMA"), ethoxylated bisphenol A dimethacrylate, 1,6-hexanediol diacrylate, pentaerythritol tetraacrylate, dipentaerythritol pentaacrylate, tris(2-hydroxyethyl) isocyanurate triacrylate, and propoxylated glyceryl triacrylate. Alternatively, the (G) may be a vinyl-functional conventional coagent selected from polybutadiene having at least 50 wt % 1,2-vinyl content and trivinyl cyclohexane ("TVCH"). Alternatively, the (G) may be a conventional coagent described in U.S. Pat. Nos. 5,346,961 or 4,018,852. Alternatively, the (G) may be a combination or any two or more of the foregoing coagents. In some aspects the polyethylene composition and crosslinked polyethylene product is free of (G). When present, the (G) coagent may be 0.01 to 4.5 wt %, alternatively 0.05 to 2 wt %, alternatively 0.1 to 1 wt %, alternatively 0.2 to 0.5 wt % of the polyethylene composition.

The optional constituent (H) nucleating agent. An organic or inorganic additive that that enhances the rate of crystallization of a polyethylene polymer. Examples of (L) are calcium carbonate, titanium dioxide, barium sulfate, ultra high-molecular-weight polyethylene, potassium hydrogen phthalate, benzoic acid compounds, sodium benzoate compounds, disodium bicyclo[2.2.1]heptane-2,3-dicarboxylate, zinc monoglycerolate, and 1,2-cyclohexanedicarboxylic acid, calcium salt:zinc stearate. In some aspects the polyethylene composition and crosslinked polyethylene product is free of (L). When present, the (L) may be in a concentration of from 0.01 to 1.5 wt %, alternatively 0.05 to 1.2 wt %, alternatively 0.1 to 1.0 wt % of the polyethylene composition.

The optional constituent (I) processing aid. Examples of (I) are fluoroelastomers.

The optional constituent (J) extender oil. Examples of (J) are mineral oils, paraffin oil, and combinations thereof.

The optional constituent (K) carbon black. A finely-divided form of paracrystalline carbon having a high surface area-to-volume ratio, but lower than that of activated carbon. Examples of (M) are furnace carbon black, acetylene carbon black, conductive carbons (e.g., carbon fibers, carbon nanotubes, graphene, graphites, and expanded graphite platelets). In some aspects the polyethylene composition and crosslinked polyethylene product is free of (M). When present, the (M) may be in a concentration of from 0.01 to 40 wt %, alternatively 0.05 to 35 wt %, alternatively 0.1 to 20 wt %, alternatively 0.5 to 10 wt %, alternatively 1 to 5 wt %, of the polyethylene composition.

The optional constituent (L) nanoparticles. Examples of (L) are nanoparticulate forms of magnesium oxide (MgO), organomontmorillontie, silica, and combinations thereof. As used herein, the (L) nanoparticles have average diameters of from 1 to 100 nanometers (nm) as measured by Tunable Resistive Pulse Sensing (TRPS). The (L) nanoparticles may be uncoated, alternatively coated with a coating material such as a hydrophobic silicon-based coating material. In some aspects the (L) is silica nanoparticles having an average diameter from 1 to 100 nm as measured in water according to ERM-FD100, *Certification of Equivalent Spherical Diameters of Silica Nanoparticles in Water*, 2011, by A. Braun, et al., European Commission, Joint Research Centre, Institute for Reference Materials and Measurements, Geel, Belgium.

The optional constituent (M) stabilizer. A particulate solid having an average particle size of 18 to 22 nanometers (nm). (M) may be carbon black or a hydrophobized fumed silica such as those commercially available under the CAB-O-SIL trade name from Cabot Corporation. The (M) UV stabilizer may also have flame retardant effects.

Optional additives (D) to (M) may be used to impart to either to the inventive composition and/or to the inventive product one or more beneficial properties. Certain additives may be sprayed onto the inventive composition to enhance extrusion thereof. Additives (D) to (M) are distinct compounds/materials from constituents (A) to (C) and from each other. In some aspects the polyethylene composition further comprises from 0 to 0.1 wt % of (F) and independently from 0 to 1 wt % of each of (G) to (M).

The polyethylene composition independently may not, alternatively may further comprise 0.005 to 0.5 wt % each of one or more optional additives selected from a carrier resin, a corrosion inhibitor (e.g., $SnSO_4$), a lubricant, an anti-blocking agent, an anti-static agent, a slip agent, a plasticizer, a tackifier, a surfactant, an acid scavenger, a voltage stabilizer, metal deactivator, and a water-tree growth retardant other than constituents (B) and (C). The water-tree growth retardant other than (B) and (C) may be a polyethylene glycol (e.g., PEG 20000).

In aspects wherein any one optional additive, such as any one of (D) to (M) or any one of the optional additives listed in the above paragraph, e.g., polyethylene glycol, is present, the amount thereof is chosen in such a way so as to not negate or counteract benefits of the inventive polyethylene composition on properties such as (i) enhanced inhibition of electrical-tree growth when tested according to Water-Tree Growth Test Method using ASTM D6097, described later; (ii) absence of bloom or sweat out of the water-tree retardant (i.e., slow or no migration of the (C) polyorganosiloxane from an interior portion to a surface of the composition and/or product) when tested according to Migration Test Method, described later; (iii) dissipation factor of less than 0.35% when measured according to the Dissipation Factor Test Method; (iv) each of (i) and (ii); (v) each of (i) and (iii); (vi) each of (ii) and (iii); or (vii) each of (i) to (iii).

The crosslinked polyethylene product. The crosslinked polyethylene product contains networked polyethylenic resins that contain C—C bond crosslinks formed during curing of the polyethylene composition. The networked polyethylenic resins comprise products of coupling the crosslinkable (A) and optionally products of coupling same with (G) alkenyl-functional coagent in the presence of the (E) organic peroxide. Other approaches for making the crosslinked polyethylene product may also be utilized, including radiation crosslinking in the absence of the (E) organic peroxide. The crosslinked polyethylene product may also contain by-products of curing such as alcohol products of the reaction of the (E) organic peroxide. When the polyethylene composition further contains one or more of any additives (D) to (M), the crosslinked polyethylene product may also contain the any one or more of the additives (D) to (M), or one or more reaction by-products formed therefrom during the curing of the polyethylene composition. The crosslinked polyethylene product may be in a divided solid form or in continuous form. The continuous form may be a molded part (e.g., blow molded part) or an extruded part (e.g., an insulation layer of an insulated electrical conductor).

The insulated electrical conductor. The insulated electrical conductor may coated metal wires and/or electrical cables, including power cables, for use in low, medium, high and extra-high voltage electricity-transmitting applications. A "wire" means a single strand or filament of conductive material, e.g., conductive metal such as copper or aluminum, or a single strand or filament of optical fiber. A "power cable" means an insulated electrical conductor comprising at least one wire disposed within a covering that may be referred to as an insulation layer. The insulated electrical conductor may be designed and constructed for use in medium, high, or extra-high voltage applications. Examples of suitable cable designs are shown in U.S. Pat. Nos. 5,246,783; 6,496,629; and 6,714,707.

The insulated electrical conductor may contain a conductive core and an outer single layer covering or an outer multilayer covering disposed therearound so as to protect and insulate the conductor core from external environments. The conductive core may be composed of one or more metal wires. When the conductive core is "stranded", it contains two or more metal wires, which may be sub-divided into discrete wire bundles. Each wire in the conductive core, whether bundled or not, may be individually coated with an insulation layer and/or the discrete bundles may be coated with an insulation layer. The single layer covering or multilayer covering (e.g., a single layer or multilayer coating or sheath) primarily functions to protect or insulate the conductive core from external environments such as sunlight, water, heat, oxygen, other conductive materials (e.g., to prevent short-circuiting), and/or other corrosive materials (e.g., chemical fumes).

The single layer or multilayer covering from one insulated electrical conductor to the next may be configured differently depending upon their respective intended uses. For example, viewed in cross-section, the multilayer covering of the insulated electrical conductor may be configured sequentially from its innermost layer to its outermost layer with the following components: an inner semiconducting layer (in physical contact with the conductive core), an insulation layer comprising the crosslinked polyethylene product (inventive crosslinked product), an outer semiconducting layer, a metal shield, and a protective sheath. The layers and sheath are circumferentially and coaxially (longitudinally) continuous. The metal shield (ground) is coaxially continuous, and circumferentially either continuous (a layer) or discontinuous (tape or wire). The outer semiconducting layer, when present, may be composed of a peroxide-crosslinked semiconducting product that may be strippable from the insulation layer.

The method of conducting electricity. The inventive method of conducting electricity may use the inventive insulated electrical conductor or may use a different electrical conductor that includes the inventive composition or product.

Advantageously we discovered that the inventive composition and/or product is characterized by decreased water-tree growth (i.e., increased inhibition of water-tree growth) when tested according to Water-Tree Growth Test Method using ASTM D6097, described later, relative to a comparative composition that contains one, but not both, of constituents (B) and (C). Embodiments of the inventive composition and/or product may also be characterized by at least one, alternatively at least two, alternatively each of properties (i) to (iv): (i) enhanced inhibition of electrical-tree growth when tested according to Water-Tree Growth Test Method using ASTM D6097, described later; (ii) absence of bloom or sweat out of the water-tree retardant (i.e., slow or no migration of the (C) polyorganosiloxane from an interior portion to a surface of the composition and/or product) when tested according to Migration Test Method, described later; (iii) dissipation factor of less than 0.35% when measured according to the Dissipation Factor Test Method, and (iv) each of (i) to (iii). Ideally a power cable containing an insulation layer composed of the inventive composition has a longer operating lifetime at higher voltages in outdoor environments.

The inventive insulated electrical conductor is useful for data-transmitting applications and/or for electricity-transmitting applications, including low, medium, high, and ultra-high voltage applications.

The inventive composition and product are useful in a variety of other applications including in containers, vehicle parts, and electronics packaging.

A compound includes all its isotopes and natural abundance and isotopically-enriched forms. The enriched forms may have medical or anti-counterfeiting uses.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyethylene or C, H, and O required by an alcohol) are not counted.

The following apply unless indicated otherwise. Alternatively precedes a distinct embodiment. AEIC means Association of Edison Illuminating Companies, Birmingham, Ala., USA. ASTM means the standards organization, ASTM International, West Conshohocken, Pa., USA. IEC means the standards organization, International Electrotechnical Commission, Geneva, Switzerland. ISO means the standards organization, International Organization for Standardization, Geneva, Switzerland. Any comparative example is used for illustration purposes only and shall not be prior art. Free of or lacks means a complete absence of; alternatively not detectable. ICEA means Insulated Cable Engineers Association and standards promulgated by IHS Markit, London, England. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). PPM are weight based. Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C. Substantially free of a specific material means 0 to 1 wt %, alternatively 0 to <0.1 wt %, alternatively 0 wt % of the material. Substituted when referring to a compound means having, in place of hydrogen, one or more substituents, up to and including per substitution.

Unless noted otherwise herein, use the following preparations for characterizations.

Polyethylene Composition Preparation Method 1. Prepares embodiments of the polyethylene composition that are free of (E) organic peroxide. Feed constituent (A) into a Brabender internal mixer at 160° C. with rotor speed set at 10 rotations per minute (rpm) for up to 4 minutes. To the resulting melt feed constituents (B) (C) to give a first inventive polyethylene composition consisting essentially of constituents (A) to (C). To the first inventive polyethylene composition was added any additives (D) and (F) to (M), and mix at 160° C. and 45 rpm for 4 minutes to obtain a second inventive polyethylene composition as a uniform dispersion of (A), (B), (C), and any (D) and (F) to (M).

Pellets Preparation Method 1. Compound the second inventive polyethylene composition prepared by Polyethylene Composition Preparation Method 1 into a hopper of a Brabender single screw extruder, and extrude a melt of the composition at 120° C. with a screw speed of 25 rpm to give the composition as a melt strand. Feed the melt strand into a Brabender Pelletizer to give the second inventive polyethylene composition in the form of pellets.

Soaking Method 1. Add 50 grams (g) of the pellets of the second inventive polyethylene composition prepared in the Pellets Preparation Method 1 and 0.865 g of (E) organic peroxide into a 250 milliliter volume, fluorinated high density polyethylene (F-HDPE) bottle. Seal the bottle containing the pellets and (E) tightly. Allow the (E) organic peroxide to soak into the pellets at 70° C. for 8 hours, shaking the sealed bottle at 0, 2, 5, 10, 20, and 30 minutes, to give a third inventive polyethylene composition as (E) organic peroxide-soaked pellets. Store the (E) organic peroxide-soaked pellets in the F-HDPE bottle at 23° C. until needed for testing.

Crosslinked Polyethylene Product and Compression Molded Plaque Preparation Method 1: Prepares compression molded plaques of crosslinked polyethylene product for dissipation factor testing. Sandwich 15 g of the (E) organic peroxide-soaked pellets prepared by Soaking Method 1 between two 2-millimeter (mm) thick poly(ethylene terephthalate) films to give a sandwich. Place the sandwich into a mold having the following dimensions: 180 mm×190 mm×0.5 mm. Place the mold containing the sandwich between upper and lower plates of a hot press machine and mold at 120° C. and 0 megapascals (MPa) applied pressure for 10 minutes to give a preheated mold. Hold the mold at 120 C. under 5 MPa for 0.5 minute, then at 120 C. under 10 MPa for 0.5 minute. Vent the mold 8 times, then hold the mold at 180° C. under 10 MPa pressure for approximately 13 minutes to give additional curing to give a crosslinked polyethylene product. Cool the mold from 180° to 25° C. under 10 MPa within 10 minutes, and remove the crosslinked polyethylene product, which is in the form of a compression-molded plaque. Test dissipation factor according to the below method.

Crosslinking Time (T90) Test Method (MDR: ML at 180° C. (N-m), MDR: MH-ML at 180° C. (N-m)): ASTM D5289-12, Standard Test Method for Rubber Property—Vulcanization Using Rotorless Cure Meters. Measure torque of a 6 grams cold pressed test sample using the following procedure. Heat test sample, obtained directly from a Brabender mixing bowl, in a moving die rheometer (MDR) instrument MDR2000 (Alpha Technologies) at 180 C. for 20 minutes at 0.5 degrees arc oscillation, while monitoring change in torque. Designate the lowest measured torque value as "ML", expressed in deciNewton-meter (dN-m). As curing or crosslinking progresses, the measured torque value increases, eventually reaching a maximum torque value. Designate the maximum or highest measured torque value as "MH", expressed in dN-m. All other things being equal, the greater the MH torque value, the greater the extent of crosslinking. Determine the T90 crosslinking time as being the number of minutes required to achieve a torque value equal to 90% of the difference MH minus ML (MH-ML), i.e., 90% of the way from ML to MH. The shorter the T90 crosslinking time, i.e., the sooner the torque value gets 90% of the way from ML to MH, the faster the curing rate of the test sample. Conversely, the longer the T90 crosslinking time, i.e., the more time the torque value takes to get 90% of the way from ML to MH, the slower the curing rate of the test sample. Measured in pound-inches (1b.-in.), and converted to Newton-meter (N-m), wherein 1.00 lb.-in.=0.113 N-m.

Density Test Method: measured according to ASTM D792-13, Standard Test Methods for Density and Specific Gravity (Relative Density) of Plastics by Displacement, Method B (for testing solid plastics in liquids other than water, e.g., in liquid 2-propanol). Report results in units of grams per cubic centimeter ($g/cm^3$).

Dielectric Constant and Dissipation Factor Test Methods. Conduct tests according to ASTM D150-11, Standard Test Methods for AC Loss Characteristics and Permittivity (Dielectric Constant) of Solid Electrical Insulation, at 50 Hz on a High Precision High Voltage Capacitance Bridge, QS87 from Shanghai Young Electrical Co. Ltd. with an electrode containing specimen holder in an oven, the high voltage power was YG8Q from Shanghai Young Electrical Co. Ltd. Test specimen is a cured (crosslinked) compression molded plaque prepared by Crosslinked Polyethylene Product and Compression Molded Plaque Preparation Method 1. Degas the plaque in a vacuum oven at 70° C. for 24 hours under atmospheric pressure. Trim test specimen, test thickness, and then sandwich between two electrodes in an oven at 110° C. immediately after the electrode temperature reached 100° C. Set potential at 2.5 kilovolts (kV), 5 kV, 7.5 kV, 10 kV, 7.5 kV, 5 kV, and 2.5 kV across the film; calculate electrical stress on the film as equal to the applied voltage across the film divided by the thickness of the film in millimeters (mm); and test dissipation factor ("Df") and relative permittivity (i.e., dielectric constant, $\varepsilon_r$). Obtain a dissipation factor (Df) curve at different electrical stress values, typically plotted over a range from 5 kV/mm to 25 kV/mm. From the curve, calculate the Df value for electrical stress equal to 16 kV/mm.

Melt index (190° C., 2.16 kilograms (kg), "$I_2$") Test Method: for ethylene-based (co)polymer is measured according to ASTM D1238-04, Standard Test Method for Melt Flow Rates of Thermoplastics by Extrusion Platometer, using conditions of 190° C./2.16 kilograms (kg), formerly known as "Condition E" and also known as $I_2$. Report results in units of grams eluted per 10 minutes (g/10 min.).

Migration Test Method. The migration additives could be observed by putting 5 grams (g) pellets into an unused transparent, self-sealing polyethylene bag and pressing the pellets 5 times to see any marks become stamped on the bag. If marks are observed record "yes" and if there are no observed marks record "no".

Scorch Time Test Method (MDR: ts1 at either 180° C. or 140° C. (minutes)): Scorch time or time to scorch (ts1) of a sample "X" is measured by MDR at 140° C. and abbreviated ts1@140° C. Scorch time measured by MDR at 180° C. is abbreviated ts1@180° C. Scorch time is measured on an Alpha Technologies Rheometer MDR 2000E according to ISO 6502 as follows. Put 5 to 6 g of test material (pellets) into the MDR 200E instrument. Torque is measured as a function of time from 0 (start) to 120 minutes at 140° C. or from 0 (start) to 20 minutes at 182° C., respectively, and torque curve versus time is plotted. The ts1 is the length of time it takes from the start of the test (0 minute) to observe an increase of 1 deciNewton-meter (dNm) in torque from the minimum value in the torque curve. Use the ts1@140° C. to characterize scorch resistance during melt processing processes (e.g., melt compounding or extrusion). Use MDR at 180° C. to characterize curing potential (MH-ML) and curing speed (see Crosslinking Time (T90) Test Method above).

Water-Tree Growth Test Method: used method according to ASTM D6097-01a (historical) or ASTM D6097-16 (currently active), Standard Test Method for Relative Resistance to Vented Water-Tree Growth in Solid Dielectric Insulating Materials. This test method covers the relative resistance to water-tree growth in solid translucent thermoplastic or crosslinked electrical insulating materials. It is especially applicable to extruded polymeric insulation materials useful in medium-voltage power cables. In summary, ten compression-molded disk specimens, each containing a controlled conical-shaped defect, are subjected to an applied voltage of 5 kilovolts (kV) at 1 kilohertz (kHz) and 23°±2° C. in an aqueous conductive solution of 0.01 Normal sodium chloride for 30 days. The controlled conical-shaped defect is created by a sharp needle with an included angle of 60° and a tip radius of 3 micrometers (μm). The electrical stress at the defect tip is thereby enhanced and is estimated by the Mason's Hyperbolic point-to-plane stress enhancement equation. This enhanced electrical stress initiates the formation of a vented water-tree grown from the defect tip. Each of the resulting treed specimens so produced is stained and sliced. The water-tree length and point-to-plane specimen thickness are measured under a microscope and used to calculate a ratio that is defined as the resistance to water-tree growth.

EXAMPLES

Constituent (A1): a low density polyethylene having a density of 0.92 gram per cubic centimeter (g/cm$^3$) and a melt index (I$_2$) (ASTM D1238-04, 190° C., 2.16 kg) of 2.0 grams per 10 minutes (g/10 min.). Available as product DXM-446 from The Dow Chemical Company, Midland, Mich., USA.

Constituent (B1): a linear polystyrene-ethylene/butylene-polystyrene (SEBS) triblock copolymer containing 18 wt % styrenic units and 72 wt % saturated ethylene/butylene comonomeric units and having a melt index (I$_2$) (ASTM D1238-04, 230° C., 2.16 kg) of 18 g/10 min. Available as product KRATON G1643 M Polymer from Kraton Corporation.

Constituent (C1): a polydimethylsiloxane (PDMS) having a kinematic viscosity of 100 mm$^2$/s at 25° C. and a density of 0.960 to 0.970 g/cm$^3$. Available as a product from Sinopharm Chemical Reagent Co., Ltd., Peoples Republic of China. Determining kinematic viscosity: use test method ASTM-D445-11a (Standard Test Method for Kinematic Viscosity of Transparent and Opaque Liquids (and Calculation of Dynamic Viscosity)) at 25° C. expressed in centiStoke (cSt) or equivalent mm$^2$/s unit.

Antioxidant (D1): the compound distearyl thiodipropionate also known as dioctadecyl 3,3'-thiodipropionate. CAS Number [693-36-7]. Available as product Irganox PS 802 from BASF.

Antioxidant (D2): the compound 1,3,5-tris[[4-(1,1-dimethylethyl)-3-hydroxy-2,6-dimethylphenyl]methyl]-1,3,5-triazine-2,4,6-(1H,3H,5H)-trione. CAS Number 40601-76-1. Available as product Cyanox 1790 from Cytec Industries.

Organic peroxide (E1): dicumyl peroxide. Available as a product from Fangruida, People's Republic of China.

Stabilizer (M1): the compound N,N'-bisformyl-N,N'-(2,2,6,6-tetramethyl-4-piperidinyl)-hexamethylenediamine. CAS Number 124172-53-8. Available as Uvinul 4050 H from BASF.

Comparative Examples 1 to 4 (CE1 to CE4): for each comparative example, prepare a series of polyethylene compositions according to Polyethylene Composition Preparation Method 1, Pellets Preparation Method 1, and Soaking Method 1, respectively. For each polyethylene composition prepared by Soaking Method 1, prepare crosslinked polyethylene products of CE1 to CE4 according to Crosslinked Polyethylene Product and Compression Molded Plaque Preparation Method 1. Test according to the above methods. Composition and test results are reported below in Table 1.

TABLE 1

| Compositions CE1 to CE4 and Test Results. ("0" means 0.00) | | | | |
|---|---|---|---|---|
| Constituent (wt %) | CE1 | CE2 | CE3 | CE4 |
| (A1) | 82.93 | 96.92 | 95.90 | 81.90 |
| (B1) | 15.00 | 0 | 0 | 16.00 |
| (C1) | 0 | 1.01 | 2.00 | 0 |
| (D1) | 0.23 | 0.23 | 0.23 | 0.23 |
| (D2) | 0.14 | 0.14 | 0.14 | 0.14 |
| (E1) | 1.70 | 1.70 | 1.70 | 1.70 |
| (M1) | 0.003 | 0.003 | 0.003 | 0.003 |
| Example Total | 100.00 | 100.00 | 100.00 | 100.00 |
| Average WTL (%) | 15.8 | 12.8 | 13.6 | 13.0 |
| Df @ 16 kV/mm, 100° C./ 50 Hz (%) | 0.02 | 0.02 | 0.03 | 0.02 |
| ML @ 180° C. (dNm) | 0.22 | 0.20 | 0.21 | 0.23 |
| MH @ 180° C. (dNm) | 3.28 | 3.57 | 3.84 | 3.37 |
| MH-ML @ 180° C. (dNm) | 3.06 | 3.37 | 3.63 | 3.14 |
| ts1 @ 180° C. (minutes) | 1.32 | 1.29 | 1.19 | 1.25 |
| ts1 @ 140° C. (minutes) | 51.8 | 45.0 | 44.0 | 44.0 |
| T90 @ 180° C. (minutes) | 4.53 | 4.64 | 4.59 | 4.24 |
| Migration | No | No | Yes | No |

As shown by the data in Table 1, CE1 to CE4 gave moderate inhibition of water-tree length (WTL) growth, allowing percentage increases from 12.8% to 15.8%. Comparing CE3 to CE2, doubling the concentration of (C), an absolute increase of merely 1 wt %, gave worse inhibition of WTL growth and resulted in "additive bloom" of (C) wherein (C) undesirably migrating to surface of pellets. Comparing CE4 to CE1, increasing (B) by 1 wt % from 15 wt % to 16 wt % gave a moderate improvement in WTL %, but the result still falls significantly short of the improvement in WLT % seen below with the combinations of (B) and (C) in IE1 to IE4.

Inventive Examples 1 to 4 (IE1 to IE4): for each inventive example, prepare a series of polyethylene compositions according to Polyethylene Composition Preparation Method 1, Pellets Preparation Method 1, and Soaking Method 1, respectively. For each polyethylene composition prepared by Soaking Method 1, prepare crosslinked polyethylene products of IE1 to IE4 according to Crosslinked Polyethylene Product and Compression Molded Plaque Preparation Method 1. Test according to the above methods. Composition and test results are reported below in Table 2.

TABLE 2

Compositions IE1 to IE4 and Test Results. ("0" means 0.00)

| Constituent (wt %) | IE1 | IE2 | IE3 | IE4 |
|---|---|---|---|---|
| (A1) | 81.92 | 89.42 | 82.43 | 89.90 |
| (B1) | 15.00 | 7.50 | 15.00 | 7.5 |
| (C1) | 1.01 | 1.01 | 0.50 | 0.5 |
| (D1) | 0.23 | 0.23 | 0.23 | 0.23 |
| (D2) | 0.14 | 0.14 | 0.14 | 0.14 |
| (E1) | 1.70 | 1.70 | 1.70 | 1.70 |
| (M1) | 0.003 | 0.003 | 0.003 | 0.003 |
| Example Total | 100.00 | 100.00 | 100.00 | 100.00 |
| Average WTL (%) | 8.8 | 5.4 | 12.1 | 8.8 |
| Df @ 16 kV/mm, 100° C./50 Hz (%) | 0.02 | 0.02 | 0.02 | 0.02 |
| ML @ 180° C. (dNm) | 0.23 | 0.21 | 0.23 | 0.23 |
| MH @ 180° C. (dNm) | 3.30 | 3.57 | 3.29 | 3.70 |
| MH-ML @ 180° C. (dNm) | 3.07 | 3.36 | 3.06 | 3.53 |
| ts1 @ 180° C. (minutes) | 1.34 | 1.25 | 1.31 | 1.21 |
| ts1 @ 140° C. (minutes) | 48.5 | 50.4 | 48.9 | 41.8 |
| T90 @ 180° C. (minutes) | 4.46 | 4.49 | 4.24 | 4.29 |
| Migration | No | No | No | No |

As shown by the data in Table 2, IE1 to IE4 unexpectedly gave better inhibition of water-tree length (WTL) growth, showing percentage increases from 5.4% to 12.1%, where the lower the percentage increases the lesser the water-tree growth. Using a combination of (B) and (C) at lower concentrations gave better inhibition of WTL (lower percentage increases) than the comparative examples containing twice the amount of one but not both (B) and (C). Also, the WTL % obtained with IE2 (concentration of (B) is 7.50 wt %) is better than that obtained with IE1 (concentration of (B) is 15.00 wt %); and a similar result is obtained comparing IE4 (concentration of (B) is 7.50 wt %) to IE3 (concentration of (B) is 15.00 wt %). These results suggest the performance of the combination of (B) and (C) in the polyethylene composition and crosslinked polyethylene product is not additive, but synergistic. The weight/weight ratio of (B)/(C) may be used to define the amounts of (B) and (C) giving synergy.

Incorporate by reference here the below claims as numbered aspects except replace "claim" and "claims" by "aspect" or "aspects," respectively.

The invention claimed is:

1. A polyethylene composition comprising
from 80 to 90 weight percent (wt %) of (A) an ethylene-based (co)polymer;
from 7.5 to 15.4 wt % of (B) a styrenic unit-containing copolymer;
from 0.1 to less than 1.5 wt % of (C) a polyorganosiloxane;
from 0.1 to 1.0 wt % of (D) an antioxidant;
from 0.5 to 2.5 wt % of (E) an organic peroxide; and
(M1) a stabilizer that is the compound N,N'-bisformyl-N,N'-(2,2,6,6-tetramethyl-4-piperidinyl)-hexamethyl-enediamine; and
wherein the polyethylene composition has a weight/weight ratio of the (B) styrenic unit-containing copolymer to the (C) polyorganosiloxane from 2 to 40.

2. The polyethylene composition of claim 1, wherein the (B) styrenic unit-containing copolymer is a linear polystyrene-ethylene/butylene-polystyrene triblock copolymer.

3. The polyethylene composition of claim 1, further comprising at least one additive chosen from: (F) a scorch retardant; (G) an alkenyl-functional coagent; (H) a nucleating agent; (I) a processing aid; (J) an extender oil; (K) carbon black; and (L) nanoparticles.

4. The polyethylene composition of claim 1, characterized by an increase in water-tree length (WTL) of less than 14% when measured according to the Water-Tree Growth Test Method using ASTM D6097.

5. The polyethylene composition of claim 1, characterized by a dissipation factor of less than 0.35% when measured according to the Dissipation Factor Test Method.

6. A method of making the polyethylene composition of claim 1, the method comprising mixing the (B) styrenic unit-containing copolymer, (C) polyorganosiloxane, the (D) antioxidant, and the (M1) stabilizer into a melt of the (A) ethylene-based (co)polymer, pelletizing the melt, and soaking the (E) organic peroxide into the pellets to give the polyethylene composition comprising constituents (A), (B), (C), (D), (E), and (M1).

7. A crosslinked polyethylene product that is a product of curing the polyethylene composition of claim 1.

8. A manufactured article comprising a shaped form of the crosslinked polyethylene product of claim 7.

9. An insulated electrical conductor comprising a conductive core and an insulation layer at least partially covering the conductive core, wherein at least a portion of the insulation layer comprises the crosslinked polyethylene product of claim 7.

10. A method of conducting electricity, the method comprising applying a voltage across the conductive core of the insulated electrical conductor of claim 9 so as to generate a flow of electricity through the conductive core.

* * * * *